United States Patent
Kao

(10) Patent No.: US 8,806,612 B2
(45) Date of Patent: Aug. 12, 2014

(54) VERIFICATION METHOD AND COMPUTER SYSTEM USING THE SAME

(75) Inventor: Yen-Pin Kao, Taipei (TW)

(73) Assignee: Quanta Computer Inc., Tao Yuan Shien (TW)

( * ) Notice: Subject to any disclaimer, the term of this patent is extended or adjusted under 35 U.S.C. 154(b) by 570 days.

(21) Appl. No.: 13/167,263

(22) Filed: Jun. 23, 2011

(65) Prior Publication Data

US 2012/0212497 A1 Aug. 23, 2012

(30) Foreign Application Priority Data

Feb. 23, 2011 (TW) ............................. 100106058 A

(51) Int. Cl.
*G06F 12/00* (2006.01)
*H04N 1/00* (2006.01)
*H04N 21/4415* (2011.01)

(52) U.S. Cl.
CPC ............ *G06F 21/26* (2013.01); *H04N 21/4415* (2013.01); *H04N 1/00411* (2013.01)
USPC ...... 726/17; 726/7; 726/19; 726/34; 345/173; 715/763

(58) Field of Classification Search
CPC . H04N 1/00441; H04N 21/4415; G06F 21/36
USPC .......................................................... 726/17
See application file for complete search history.

(56) References Cited

U.S. PATENT DOCUMENTS

| | | | |
|---|---|---|---|
| 6,606,543 B1 * | 8/2003 | Sproule et al. | 701/1 |
| 7,593,000 B1 * | 9/2009 | Chin | 345/156 |
| 2009/0006991 A1 * | 1/2009 | Lindberg et al. | 715/763 |
| 2009/0036100 A1 * | 2/2009 | Lee | 455/411 |
| 2010/0325721 A1 * | 12/2010 | Bandyopadhyay et al. | 726/19 |
| 2011/0041102 A1 * | 2/2011 | Kim | 715/863 |
| 2011/0053641 A1 * | 3/2011 | Lee et al. | 455/556.1 |
| 2011/0279384 A1 * | 11/2011 | Miller et al. | 345/173 |
| 2011/0283241 A1 * | 11/2011 | Miller et al. | 715/863 |
| 2013/0047236 A1 * | 2/2013 | Singh | 726/7 |

FOREIGN PATENT DOCUMENTS

TW 201101086 A 1/2011

OTHER PUBLICATIONS

Google Patent Search.*
Google Scholar search.*

* cited by examiner

*Primary Examiner* — Arvin Eskandarnia
(74) *Attorney, Agent, or Firm* — Rabin & Berdo, P.C.

(57) ABSTRACT

A verification method including a set flow and the identification flow is provided. The set flow includes: displaying an original outline pattern; executing a coloring operation on the original outline pattern in response to a user encryption coloring event to generate and display a colored outline pattern; storing the colored outline pattern. The identification flow includes: displaying an original outline pattern; executing a coloring operation on the original outline pattern in response to a user verification coloring event to generate and display a to-be identified colored outline pattern; determining whether the to-be identified colored outline pattern is equal to the colored outline pattern; if yes, triggering the verification pass event; if not, triggering the verification fail event.

8 Claims, 3 Drawing Sheets

VERIFICATION METHOD AND COMPUTER SYSTEM USING THE SAME

This application claims the benefit of Taiwan application Serial No. 100106058, filed Feb. 23, 2011, the subject matter of which is incorporated herein by reference.

BACKGROUND OF THE INVENTION

1. Field of the Invention

The invention relates in general to a verification method and a computer system using the same, and more particularly to a verification method which executing a verification operation via pattern and a computer system using the same.

2. Description of the Related Art

With the rapid advance in science and technology, various electronic products are provided to benefit people's life. Under normal operation, most electronic products are equipped with a unlock mechanism which enables a mobile phone to enter a normal mode from a standby or lock mode, or a verification mechanism realized by such as an account password log-in mechanism of a computer system.

The existing technologies, most of electronic products implement the aforesaid verification or unlock mechanism by account and password.

However, how to provide a more intuitive verification mechanism and unlock mechanism to facilitate user's operation and memory has become a prominent task for the industries.

SUMMARY OF THE INVENTION

The invention is directed to a verification method and a computer system using the same. In comparison to the unlock mechanism and verification mechanism used in conventional electronic products, the verification method and the computer system using the same of the invention have the advantages that the operation mechanism is more intuitive, convenient and personalized and is easier to remember.

According to a first aspect of the present invention, a verification method used in a computer system is provided. The computer system includes a display, a user input interface device and a memory. The verification method includes a set flow and an identification flow. The set flow includes: driving the display to display an original outline pattern; executing a coloring operation on the original outline pattern in response to a user encryption coloring event triggered by the user input interface device to correspondingly generate and display a colored outline pattern, wherein the colored outline pattern at least corresponds to a first color information; storing the colored outline pattern in the memory. The identification flow includes: driving the display to display an original outline pattern; executing a coloring operation on the original outline pattern in response to a user verification coloring event triggered by the user input interface device to correspondingly generate and display a to-be identified colored outline pattern, wherein the to-be identified colored outline pattern at least corresponds to a second color information; determining whether the to-be identified colored outline pattern is equal to the colored outline pattern; if yes, correspondingly triggering the verification pass event; if not, correspondingly triggering the verification fail event.

According to a second aspect of the present invention, a computer system including a user interface device, a memory, a display and a processor is provided. The user input interface device triggers a user encryption coloring event and a user verification coloring event. The processor is coupled to the user input interface device, the memory and the display for executing a set flow to correspondingly: drive the display to display an original outline pattern; execute a coloring operation on the original outline pattern in response to the user encryption coloring event to correspondingly generate and display a colored outline pattern, which at least corresponds to a first color information; store the colored outline pattern in the memory. The processor further executes an identification flow to correspondingly: drive the display to display an original outline pattern; executing a coloring operation on the original outline pattern in response to a user verification coloring event to correspondingly generate and display a to-be identified colored outline pattern on the display, wherein the to-be identified colored outline pattern at least corresponds to a second color information; determine whether the to-be identified colored outline pattern is equal to the colored outline pattern; if yes, the processor correspondingly trigger a verification pass event; if not, the processor correspondingly triggers a verification fail event.

The above and other aspects of the invention will become better understood with regard to the following detailed description of the preferred but non-limiting embodiment(s). The following description is made with reference to the accompanying drawings.

DETAILED DESCRIPTION OF THE INVENTION

According to the verification method of the present embodiment of the invention, a coloring operation is executed on an outline pattern displayed by a display so as to implement a unlock mechanism and a verification mechanism in a computer system.

Figure 1:
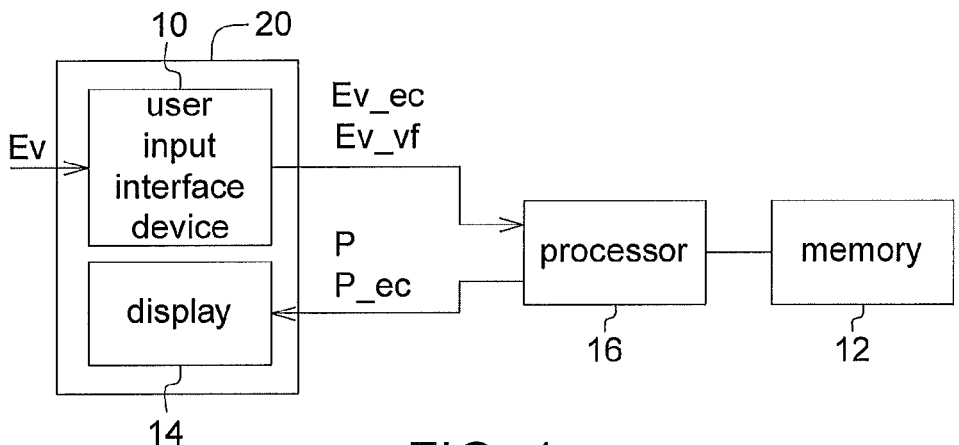
FIG. 1 shows a diagram of a computer system according to an embodiment of the invention.

Referring to FIG. 1, a diagram of a computer system according to an embodiment of the invention is shown. The computer system 1 includes a user input interface device 10, a memory 12, a display 14 and a processor 16. The user input interface device 10 correspondingly triggers a user encryption coloring event Ev_ec or a user verification coloring event Ev_vf in response to a user operation Ev. For example, the user input interface device 10 can be realized by a mouse, a touch panel or a press key. In the present embodiment of the invention, the user input interface device 10 and the display 14 are integrated into one touch display 20 with touch function. The user encryption coloring event Ev_ec refers to the event that the user executes coloring or stripe arrangement on each region of a pattern. The user verification coloring event Ev_vf refers to the event that the inputted color or stripe arrangement is the same with that in the user encryption coloring event Ev_ec when the user would like to execute unlocking (such as screen unlocking) or decryption (such as file or file decryption).

The processor 16 is coupled to the user input interface device 10, the memory 12 and the display 14, and controls the operation of the aforesaid hardware. The processor 16 is such as programmed for executing a set flow of the encryption coloring event Ev_ec and an identification flow of the encryption coloring event Ev_vf so as to implement the verification method disclosed in the present embodiment of the invention.

Figure 2:
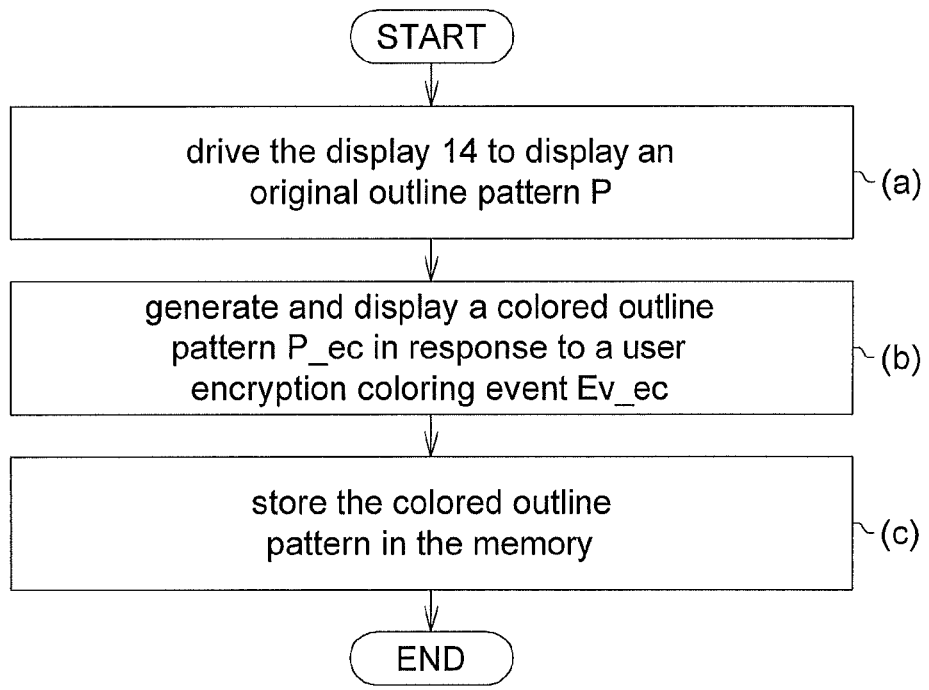
FIG. 2 shows a flowchart of a verification method according to an embodiment of the invention.
Figure 3:
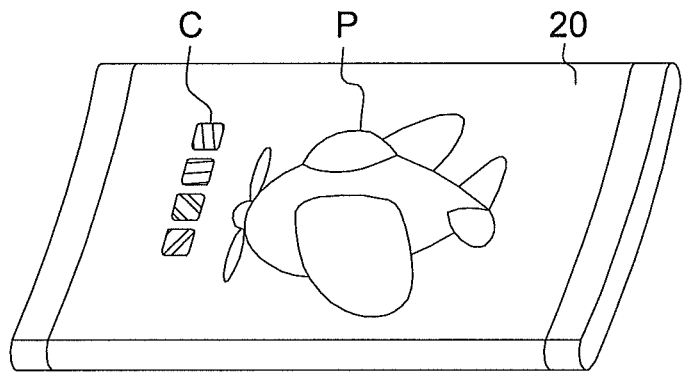
FIG. 3 shows an original outline pattern P according to an embodiment of the invention.

Referring to FIG. 2, a flowchart of a verification method according to an embodiment of the invention is shown. In greater details, the aforesaid set flow includes steps (a)-(c). Firstly, the flow begins at step (a), the display 14 is driven by the processor 16 to display an original outline pattern P and optionally a palette control column C. For example, the original outline pattern P can be an airplane outline pattern as illustrated in FIG. 3. In a practical embodiment, the palette control column C is exemplified by a stripe pattern, but the invention is not limited thereto, and the palette control column C can also be denoted by colors.

Next, the method proceeds to step (b), the user input interface device 10 correspondingly triggers the user encryption coloring event Ev_ec in response to the user operation Ev. The processor 16 executes a coloring operation on the original outline pattern P in response to the user encryption coloring event Ev_ec to correspondingly generate a stripe arrangement or color on each outline region of the original outline pattern P to generate and drive the display 14 to display a colored outline pattern P_ec, wherein each outline region of the colored outline pattern P_ec corresponds to at least one color or stripe information.

Figure 4:
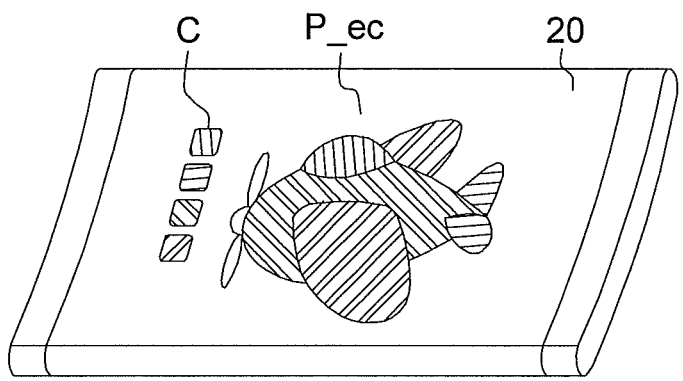
FIG. 4 shows a colored outline pattern P_ec according to an embodiment of the invention.

For example, the user event Ev is such as an event of clicking the color of the palette control column C of the touch display 20 by a finger, which means the event of encrypting each outline region of the outline pattern P (i.e. user encryption coloring event Ev_ec). Thus, in response to the aforesaid user operation, the computer system 1 correspondingly generates the colored outline pattern P_ec as illustrated in FIG. 4, wherein the regions denoted by different slash lines and grids correspond to different colors or strips information.

Then, the method proceeds to step (c), the processor 16 stores the colored outline pattern P_ec in the memory 12. Thus, the computer system 1 correspondingly generates a verification criterion of the verification flow through the user encryption coloring event Ev_ec.

Figure 5:
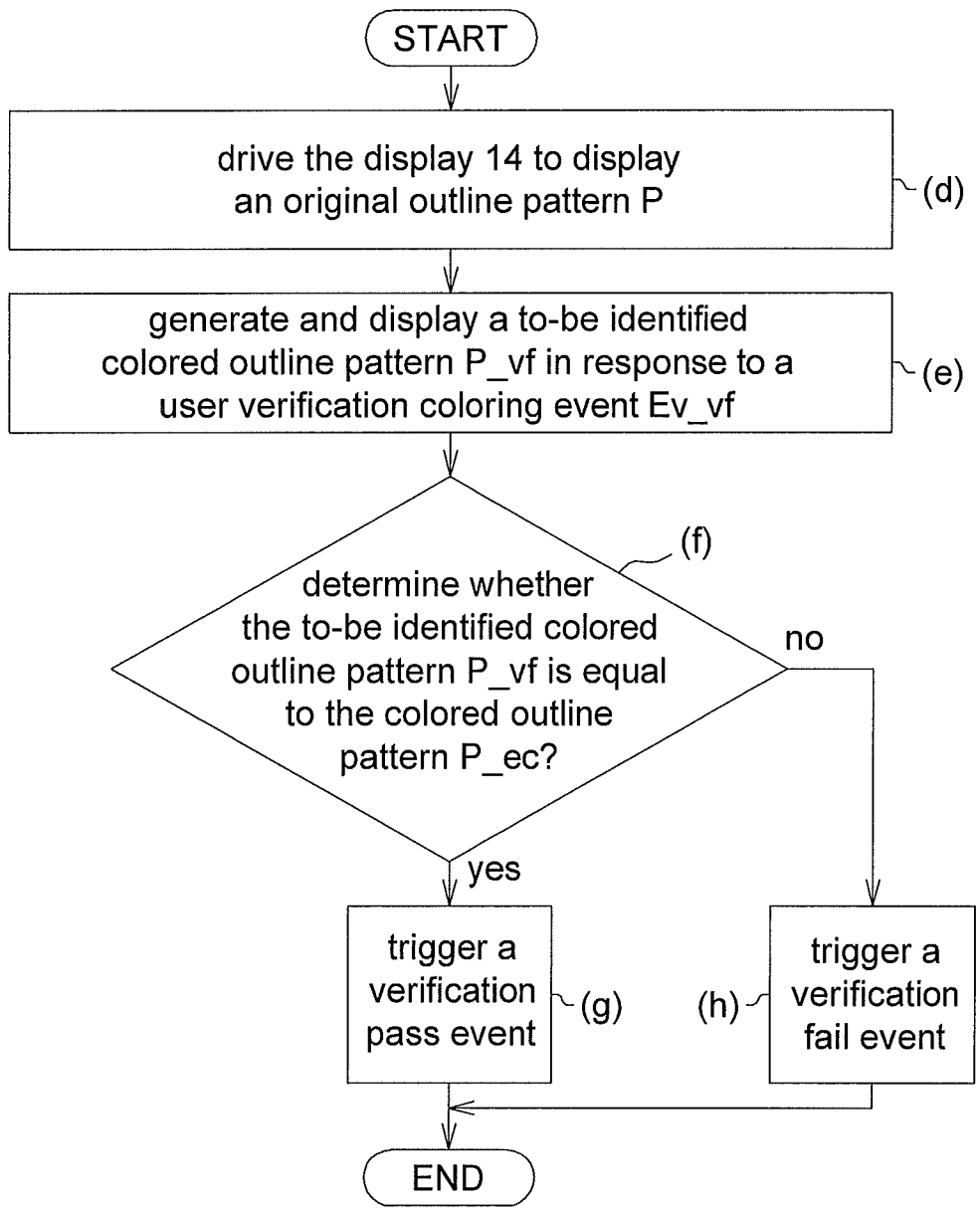
FIG. 5 shows another partial flowchart of a verification method according to an embodiment of the invention.

Referring to FIG. 5, a verification method according to an embodiment of the invention is shown. The verification method relates to a user verification coloring event Ev_vf which includes steps (d)-(h). For enabling the processor 16 to execute the verification method, the user may trigger an initialization control event. For example, when the computer system 1 is an ordinary desktop computer, the initialization control event can be an event that the user presses the warm start button, moves the mouse, or inputs a word string via the keyboard to unlock the screen or decrypt a file. When the computer system 1 is a mobile phone or a portable communication device, the initialization control event is an event that the user unlocks the screen or decrypts a file by turning or sliding the screen or touching the track ball or the touch panel.

Next, the verification method proceeds to step (d), the processor 16 drives the display 14 to display the original outline pattern P and optionally the palette control column C.

Then, the verification method proceeds to step (e), the user input interface device 10 correspondingly triggers the user verification coloring event Ev_vf in response to the user event Ev. The processor 16 executes a coloring operation on the original outline pattern P in response to the user verification coloring event Ev_vf to correspondingly generate a color or stripe arrangement on each outline region of the original outline pattern P and drive the display 14 to display a to-be identified colored outline pattern P_vf, wherein each outline region of the outline pattern P_vf corresponds to at least one color or stripe information.

Then, the verification method proceeds to step (f), the processor 16 determines whether the to-be identified colored outline pattern P_vf is the same as the colored outline pattern P_ec. If yes, the verification method proceeds to step (g), the processor 16 determines that the user triggering the user verification coloring event Ev_vf satisfies the verification criterion, and correspondingly triggers a verification pass event. For example, the verification pass event can be an event that the screen is unlocked, a welcome screen is provided, or a normal operation mode is resumed from a sleep mode, or an event that a file is unlocked so that the file can be opened.

If the to-be identified colored outline pattern P_vf is not the same as the colored outline pattern P_ec, the verification method proceeds to step (h), the processor determines that the user triggering the user verification coloring event Ev_vf does not satisfy the verification criterion, and correspondingly triggers a verification fail event. For example, the verification fail event can be an event that the display 14 displays an error message or re-displays an original outline pattern P.

In the present embodiment of the invention, the verification method of the present embodiment of the invention uses the colored outline pattern as a verification criterion. However, the verification method of the present embodiment of the invention is not limited to such exemplification. In other examples, the verification criterion used by the verification method of the present embodiment of the invention can further take the order of coloring the original outline pattern as verification criteria or provide the palette control column C with both colors and stripe patterns for the user to select in step (d), so as to add complexity to verification.

For example, in the set flow and the identification flow, the processor 16 respectively stores a first coloring order corresponding to colored outline pattern P_ec in the memory 12 and storing a second coloring order information corresponding to the to-be identified colored outline pattern P_vf. When the processor 16 determines that the to-be identified colored outline pattern P_vf is equal to the colored outline pattern P_ec, the processor 16 further determines whether the first and the second coloring order information are equal. If yes, then the processor 16 correspondingly triggers a verification pass event. If not, then the processor 16 correspondingly triggers a verification fail event.

The verification method of the present embodiment of the invention includes a set flow, in which a colored outline pattern is generated in response to a user encryption coloring event correspondingly triggered by the user and is further used as a verification criterion. The verification method of the present embodiment of the invention further includes an identification flow, in which a to-be identified colored outline pattern is generated in response to a user verification coloring event triggered by the user and whether the to-be identified colored outline pattern is equal to the aforesaid colored outline pattern is determined so as to execute verification. In comparison to the unlock mechanism and verification mechanism used in conventional electronic products, the verification method and the computer system using the same of the invention have the advantages that the operation mechanism is more intuitive, convenient and personalized and easier to remember.

While the invention has been described by way of example and in terms of the preferred embodiment(s), it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A verification method used in a computer system comprising a display, a user input interface device and a memory, wherein the verification method comprises:
a set flow, comprising:
- driving the display to display an original outline pattern and a palette control column;
- executing a coloring operation on the original outline pattern in response to a user encryption coloring event triggered by the user input interface device to correspondingly generate and display a colored outline pattern, which at least corresponds to a first color information; and
- storing the colored outline pattern in the memory; and an identification flow, comprising:
- driving the display to display the original outline pattern and the palette control column;
- executing a coloring operation on the original outline pattern in response to a user verification coloring event triggered by the user input interface device to correspondingly generate and display a to-be identified colored outline pattern, which at least corresponds to a second color information;
- determining whether the to-be identified colored outline pattern is equal to the colored outline pattern;
- correspondingly triggering a verification pass event when the to-be identified colored outline pattern is equal to the colored outline pattern; and
- correspondingly triggering a verification fail event when the to-be identified colored outline pattern is not equal to the colored outline pattern.

2. The verification method according to claim 1, wherein the set flow further comprises:
corresponding to a first coloring order information of the colored outline pattern.

3. The verification method according to claim 2, wherein the identification flow further comprises:
- corresponding to a second coloring order information of the to-be identified colored outline pattern;
- determining whether the first coloring order information and the second coloring order information are equal if the to-be identified colored outline pattern is equal to the colored outline pattern;
- correspondingly triggering the verification pass event when the first and the second coloring order information are equal; and
- correspondingly triggering the verification fail event when the first and the second coloring order information are not equal.

4. The verification method according to claim 1, wherein the first coloring order information and the second coloring order information comprise stripe information.

5. A computer system, comprising:
- a user input interface device for triggering a user encryption coloring event and a user verification coloring event;
- a memory;
- a display; and
- a processor coupled to the user input interface device, the memory and the display for executing a set flow to correspondingly:
  - drive the display to display an original outline pattern and a palette control column;
  - execute a coloring operation on the original outline pattern in response to the user encryption coloring event to correspondingly generate and display a colored outline pattern, which at least corresponds to a first color information; and
  - store the colored outline pattern in the memory;
- wherein, the processor further executes an identification flow to correspondingly:
  - drive the display to display the original outline pattern and the palette control column;
  - execute a coloring operation on the original outline pattern in response to the user verification coloring event to correspondingly generate and display a to-be identified colored outline pattern on the display, wherein the to-be identified colored outline pattern at least corresponds to a second color information; and
  - determine whether the to-be identified colored outline pattern is equal to the colored outline pattern;
- wherein, the processor correspondingly triggers a verification pass event when the to-be identified colored outline pattern is equal to the colored outline pattern, and correspondingly triggers a verification fail event when the to-be identified colored outline pattern is not equal to the colored outline pattern.

6. The computer system according to claim 5, wherein the set flow further comprises:
corresponding to a first coloring order information of the colored outline pattern.

7. The computer system according to claim 6, wherein the identification flow further comprises:
- corresponding to a second coloring order information of the to-be identified colored outline pattern;
- determining whether the first coloring order information and the second coloring order information are equal when the to-be identified colored outline pattern is equal to the colored outline pattern;
- correspondingly triggering the verification pass event if the first and the second coloring order information are equal; and
- correspondingly triggering the verification fail event when the first and the second coloring order information are not equal.

8. The computer system according to claim 5, wherein the first color order and the second color information comprise stripe information.

* * * * *